(12) United States Patent
Thomas et al.

(10) Patent No.: US 6,848,760 B2
(45) Date of Patent: Feb. 1, 2005

(54) DRAWER SLIDE

(75) Inventors: Rüdiger Thomas, Haiger (DE);
Torsten Müller, Hilchenbach (DE)

(73) Assignee: Westfalia Profiltechnik GmbH & Co. KG, Hilchenbach (DE)

( * ) Notice: Subject to any disclaimer, the term of this patent is extended or adjusted under 35 U.S.C. 154(b) by 0 days.

(21) Appl. No.: 10/361,786

(22) Filed: Feb. 10, 2003

(65) Prior Publication Data

US 2003/0173880 A1 Sep. 18, 2003

(30) Foreign Application Priority Data

Feb. 13, 2002 (DE) .......................................... 102 06 075

(51) Int. Cl.⁷ .............................................. A47B 88/04
(52) U.S. Cl. ............................... 312/334.38; 312/334.9; 312/334.1; 312/334.11; 312/334.12; 312/334.13; 312/334.15; 312/334.17; 312/334.18; 312/334.25; 312/334.26; 312/334.32; 312/334.33; 312/334.37; 312/334.39
(58) Field of Search .................. 312/334.38, 334.9, 312/334.1, 334.11, 334.12, 334.13, 334.15, 334.17, 334.18, 334.25, 334.26, 334.33, 334.32, 334.39, 334.45

(56) References Cited

U.S. PATENT DOCUMENTS

| | | | | |
|---|---|---|---|---|
| 2,762,660 A | * | 9/1956 | Bullock | 312/334.13 X |
| 3,743,366 A | * | 7/1973 | Tazaki | 312/334.9 X |
| 5,344,228 A | * | 9/1994 | Kovarik et al. | 312/334.9 |
| 5,570,943 A | * | 11/1996 | Schroder et al. | 312/334.11 |
| 6,386,659 B1 | | 5/2002 | Muller | |
| 6,460,954 B1 | * | 10/2002 | Bayani et al. | 312/334.11 X |

FOREIGN PATENT DOCUMENTS

| | | | | |
|---|---|---|---|---|
| EP | | 46531 A2 * | 3/1982 | 312/334.9 |

* cited by examiner

*Primary Examiner*—Rodney B. White
(74) *Attorney, Agent, or Firm*—Herbert Dubno; Andrew Wilford

(57) ABSTRACT

A slide has a pair of identical longitudinally extending and profiled rails each having at least one flange forming two longitudinally extending tracks. The rails are interfitted with the tracks of one rail transversely confronting the tracks of the other rails. Respective longitudinally extending rows of balls engaged in the tracks between the rails.

9 Claims, 2 Drawing Sheets

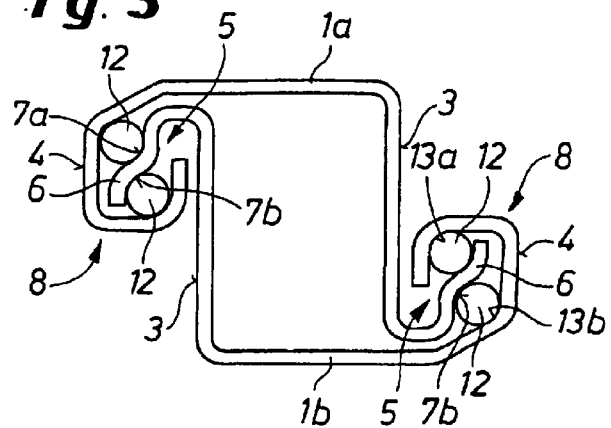
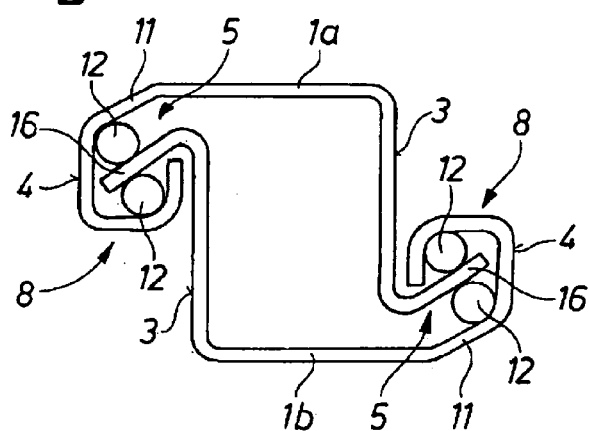
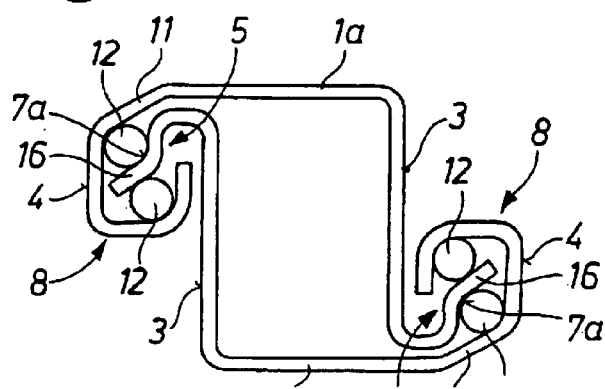

DRAWER SLIDE

FIELD OF THE INVENTION

The present invention relates to a drawer slide. More particularly this invention concerns such a slide comprised of two rails bearing on each other via arrays of balls.

BACKGROUND OF THE INVENTION

A standard drawer slide has as described in U.S. Pat. No. 6,386,659 an outer rail forming a plurality of parallel and inwardly open tracks, an inner rail fitting in the outer rail and having a plurality of flat surfaces each confronting and extending parallel to a respective one of the tracks, and a respective row of balls in each of the tracks and riding on the respective inner-rail surface. Normally each of the flat surfaces is perpendicular to a bisector of the respective track corner. Such a slide is used in many different applications, for instance to support a drawer in a piece of furniture or in a vehicle, to carry a shelf usable to support an appliance or as a work surface, or even to carry a seat in a motor vehicle.

This arrangement is highly effective. One of the rails is normally secured to a fixed support and the other to the slidable part—drawer, seat, or the like—such that, when the movable rail moves through its stroke, the balls travel through half this stroke.

The slide is therefore typically formed of four different parts, the two rails, the balls, and the cages that hold the balls at a predetermined spacing from each other. The main expense of manufacture is in the production of the two complexly profiled rails. Each must be made in its own machine having specially configured rollers or dies to produce the two different profiles needed for the interfitting rails.

OBJECTS OF THE INVENTION

It is therefore an object of the present invention to provide an improved slide.

Another object is the provision of such an improved slide which overcomes the above-given disadvantages, that is which is easier and cheaper to manufacture than the prior-art slides.

SUMMARY OF THE INVENTION

A slide has according to the invention a pair of identical longitudinally extending and profiled rails each having at least one flange forming two longitudinally extending tracks. The rails are interfitted with the tracks of one rail transversely confronting the tracks of the other rails. Respective longitudinally extending rows of balls engaged in the tracks between the rails. Thus manufacturing costs are greatly reduced since both rails are identical.

More specifically according to the invention the slide has a pair of identical longitudinally extending and profiled rails each having a center longitudinally extending bight having longitudinally extending first and second edges from which extend respective first and second flanges projecting generally transversely from edges. The second flange defines with the first flange a longitudinally extending and transversely open space. The first flange is shaped as an inside hook having an outer leg lying in the space and forming with the first flange a pair of confronting, transversely open, and longitudinally extending tracks. The second flange is shaped as an outside hook having an outer leg lying outside the respective space. The rails are interfitted with the second-flange outer leg of each rail lying in the space of the other rail between the tracks of the first flange of the other rail. Respective longitudinally extending rows of balls are engaged in the tracks between the rails.

The first and second flanges extend transversely in the same direction from the center bight of the respective rail. In addition according to the invention the first flange is shorter than the respective second flange.

The inside hooks each have an inner leg extending generally parallel to and spaced from the respective outer leg and a bight portion interconnecting the inside-hook-inner and outer legs and extending generally parallel to the center bight. They further each have a connecting inner bight extending at an acute angle to the respective legs and to the center bight. The inner bight connects the respective inner leg with the respective first edge.

The second-flange outer leg in accordance with the invention can be generally flat and planar. Alternately it is of flattened S-shape and forms a pair of longitudinally extending second-flange tracks confronting the first-flange tracks, or is of flattened U-shape and forms a longitudinally extending second-flange track confronting a respective one of the first-flange tracks. In most cases the second-flange outer leg extends at an acute angle to the respective center bight. One of the rows of balls can include only a single ball, particularly in applications where there is likely to be little need for support in that direction.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 3 shows a completed slide according to FIGS. 1 and 2; and

FIGS. 4 and 5 are views like FIG. 3 of alternative slides in accordance with the invention.

SPECIFIC DESCRIPTION

Figure 1:
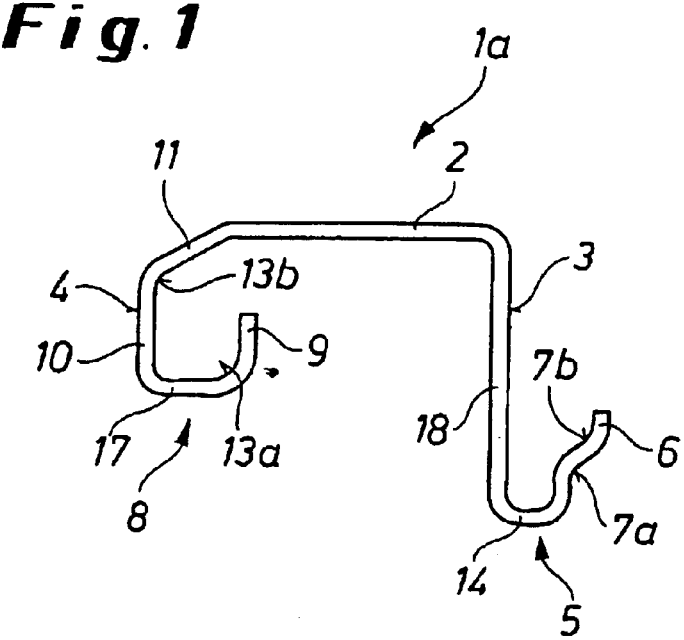
FIG. 1 is a cross section through a rail according to the invention.

As seen in FIG. 1 a rail 1a according to the invention has a center planar bight 2 lying in a plane perpendicular to the view plane and formed with first and second longitudinally extending edges from which extend first and second full-length edge flanges 3 and 4 respectively shaped as an outside hook 5 and an inside hook 8. The rail 1a is a continuous rolled or extruded metal part of uniform cross-sectional shape.

The inside hook 8 is comprised of an inner bight 11 extending at about 45° to the center bight 2, and parallel outer and inner legs 9 and 10 extending in planes perpendicular to the center bight 2 from an outer bight 17 extending parallel to the center bight 2, the inner leg 10 connecting the outer bight 17 to the inner bight 11. An inside corner or track 13a formed between the outer leg 9 and the outer bight 17 generally confronts another corner or track 13b formed between the inner bight 11 and the inner leg 10.

The outside hook 5 has a connecting bight 18 extending perpendicularly from the respective edge of the center bight 2 and forming the inner leg of the hook 5, a bight 14, and an outer leg 6 of flattened S-shape forming a pair of oppositely directed grooves or tracks 7a and 7b. The tracks 7a, 7b, 13a, and 13b are formed as shallow grooves of part-cylindrical shape extending parallel to each other.

Figure 2:
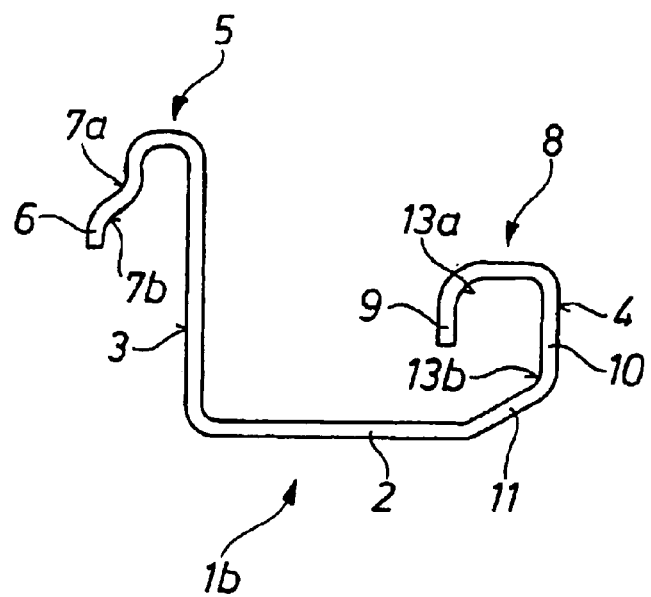
FIG. 2 is a cross section showing a rail identical to the rail of FIG. 1 but differently oriented so as to interfit with the FIG. 1 rail.

FIG. 2 shows the same structure as FIG. 1, but as a rail 1b rotated through 180° so as to be open upward, rather than downward. In FIG. 3 the two rails 1a and 1b are fitted together, with the outer legs 6 of the outside hooks 5 fitted between the legs 9 and 10 of the inside hooks 8. In this orientation each of the tracks 7a directly confront a respective one of the tracks 13b and the tracks 7b similarly directly confront the tracks 13a. Respective rows of balls 12 are received in the confronting track pairs 7a, 13b and 7b, 13a, effectively captured by the interfitting shapes of the two rails 1a and 1b. Unillustrated cages, typically formed as thin sheet-metal elements each having a row of circular holes for the balls 12, hold the balls 12 at a predetermined longitudinal spacing. Thus there are four rows of balls 12 supporting the rails 1a and 1b in each other, making for a very solid but smooth mounting. The structure of FIG. 3 is for instance particularly suitable for use supporting a front bucket seat on a vehicle floor, with a pair of the upwardly open rails 1b bolted to the vehicle floor and a pair of the downwardly open rails 1a screwed to the bottom of the seat frame.

In FIG. 4 the outside hook 5 is of simple construction, lacking the bight 14 and just having a single planar outer leg 16. Here the balls 12 are captured in the tracks 13a and 13b and simply ride on the flat planar faces of the flange 16. This construction is particularly easy to manufacture and does not have to be manufactured to tolerances as tight as those of FIGS. 1–3.

The arrangement of FIG. 5 is a hybrid of that of the two above-described structures. It has an outer hook 5 that is of flattened U-shape, forming a single track 7a, but its opposite side is mainly flat so there is no groove forming the track 7b. Instead, the rollers 12 on this face simply ride on a planar face of the flange 16. Here only a single ball 12 need be provided between the confronting tracks 7a and 13b.

In all the described systems, the two profiles 1a and 1b are absolutely identical to each other. Thus the manufacturer need only produce one such complexly profiled piece rather than two, greatly reducing overall manufacturing costs.

We claim:

1. A slide comprising:
   a pair of longitudinally extending and profiled rails of identical section and each having
   a center longitudinally extending bight having longitudinally extending first and second edges,
   a first flange projecting generally transversely from the first edge;
   a second flange projecting generally transversely from the second edge and defining with the first flange a longitudinally extending and transversely open space, the first flange being shaped as an inside hook having an outer leg lying in the space and forming with the first flange a pair of confronting, transversely open, and longitudinally extending tracks, the second flange being shaped as an outside hook having an outer leg lying outside the respective space,
   the rails being interfitted with the second-flange outer leg of each rail lying in the space of the other rail, between the tracks of the first flange of the other rail; and
   respective longitudinally extending rows of balls engaged in the tracks between the rails.

2. The slide defined in claim 1 wherein the first and second flanges extend transversely in the same direction from the center bight of the respective rail.

3. The slide defined in claim 2 wherein the first flange is shorter than the respective second flange.

4. The slide defined in claim 2 wherein the inside hooks each have an inner leg extending generally parallel to and spaced from the respective outer leg, and a bight portion interconnecting the inside-hook inner and outer legs and extending generally parallel to the center bight.

5. The slide defined in claim 4 wherein the inside hooks each have a connecting inner bight extending at an acute angle to the respective legs and to the center bight, the inner bight connecting the respective inner leg with the respective first edge.

6. The slide defined in claim 2 wherein the second-flange outer leg is generally flat and planar.

7. The slide defined in claim 2 wherein the second-flange outer leg is of flattened S-shape and forms a pair of longitudinally extending second-flange tracks confronting the first-flange tracks.

8. The slide defined in claim 2 wherein the second-flange outer leg is of flattened U-shape and forms a longitudinally extending second-flange track confronting a respective one of the first-flange tracks.

9. The slide defined in claim 2 wherein the second-flange outer leg extends at an acute angle to the respective center bight.

* * * * *